UNITED STATES PATENT OFFICE.

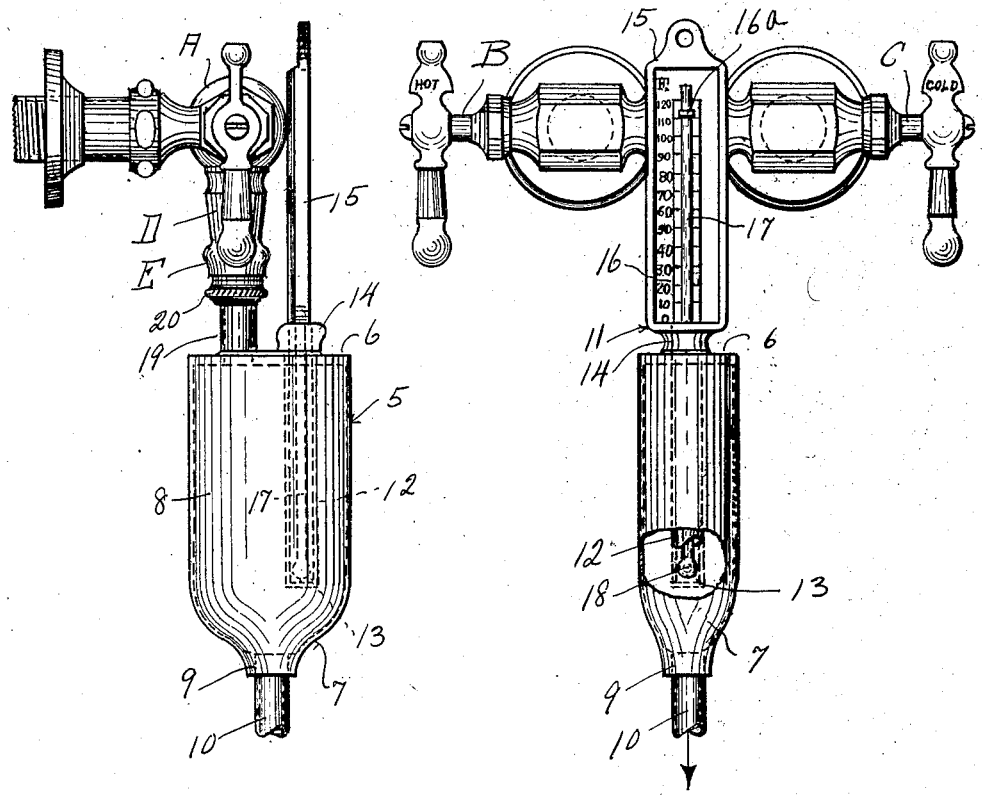

ARCHIE S. CAMPBELL, OF ST. JOHNSBURY, VERMONT.

THERMOMETER ATTACHMENT FOR FAUCETS.

1,397,720.     Specification of Letters Patent.     Patented Nov. 22, 1921.

Application filed May 1, 1920. Serial No. 378,284.

*To all whom it may concern:*

Be it known that I, ARCHIE STEWART CAMPBELL, a citizen of the United States, residing at St. Johnsbury, in the county of Caledonia and State of Vermont, have invented certain new and useful Improvements in Thermometer Attachments for Faucets, of which the following is a specification, reference being had to the accompanying drawings.

This invention relates to a thermometer for liquid outlets and has for its object to provide a device of this character that can be readily attached to a faucet to register the temperature of the water or liquid discharged from the faucet.

Another object is to provide a device of this character that can be attached to a double valve faucet to register the temperature of hot and cold water or the combination of the two.

A further object is to provide a device of this character wherein the thermometer is protected at all times so that it may be readily removed and applied and will not be damaged by water pressure.

A still further object is to provide a device of this character including a receptacle which temporarily retains the liquid therein in order that it may engage the thermometer and remain long enough to permit the thermometer to accurately register the temperature.

With these and other objects in view the invention consists in the improved construction and arrangement of parts to be hereinafter more particularly described, fully claimed and illustrated in the accompanying drawings, wherein:

Figure 1 is a side elevation of a thermometer attachment constructed in accordance with an embodiment of the invention, the thermometer being applied to a faucet.

Fig. 2 is a front elevation of the attachment in position on a faucet.

Referring to the drawings A designates a faucet which in the present instance is of the double valve type having the usual valve B for controlling the hot water and the usual valve C for controlling the cold water. It will be understood that this device can be used on single valve faucets as well as faucets including several valves. The discharge nozzle D is disposed between the valves B and C and serves as an outlet for both hot and cold water. This nozzle has an enlarged end E which is interiorly threaded, the purpose of which will be hereinafter described.

In order to register the temperature of both hot and cold water, chemicals or any liquid, a receptacle 5 is provided and includes oval or elliptical ends 6 and 7 and sides 8. The end 7 extends gradually toward the center thereof and is formed into an outlet 9 from which a discharge nozzle 10 extends. The end 6 is closed and provided with a plurality of openings. A thermometer support 11 is provided and includes a casing 12, open at its end 13 and provided at its upper end with a collar 14. The collar 14 is formed integral with a frame 15 in which a thermometer scale 16 is mounted. A thermometer 17 is disposed in the support 11 and has its upper portion secured in the frame 15 by means of the clamp 16ᵃ while the remainder of the thermometer extends through the collar 14 and has its bulb 18 disposed closely adjacent the end 13 of the casing 12. The thermometer support is threaded in one of the openings in the end 6. In view of the novel construction of the thermometer support, the same can be readily removed from the receptacle with ease and rapidity without danger of damaging the thermometer as it is fully protected.

Disposed in the remaining opening in the end 6 of the receptacle is an inlet pipe 19 which is disposed in alinement with the frame 15. Operatively engaged with the inlet pipe 19 is a coupling member 20 which is exteriorly threaded. This coupling member is intended to engage the internal threads of the enlarged end E of the faucet to connect the thermometer to the faucet, the free movement of the member 20 permitting the device to be easily connected without the use of a wrench and without rotating the receptacle. When the device is in position on a faucet, the frame 15 extends upwardly in front of the nozzle D and terminates slightly above the upper portion of the faucet so that the device is rendered compact in form.

The water discharged from the faucet A is received into the receptacle rearwardly of the thermometer, the casing 12 preventing the pressure of water from breaking the tube of the thermometer and also prevents the unnatural temperature of the water caused by pressure thereof from affecting the thermometer. The water is not discharged against the thermometer as will be seen in Fig. 1 but descends unobstructed to the end 7 of the receptacle. As the end 7 tapers or merges toward the outlet 9, the water will be retained temporarily in view of the restricted opening so that the bulb 18 of the thermometer will have sufficient time in which to register the temperature of the water disposed in the receptacle, so that when the temperature of the water is registered, the same is not under pressure and as it is retained in the lower portion of the receptacle temporarily a portion thereof enters the open end 13 of the casing and engages the bulb 18 thereby causing the same to accurately register the temperature.

It will be noted that the thermometer is not disposed in the path of the water entering the receptacle but is disposed to one side of the center of the end 6, the outlet 9 being disposed centrally of the bottom 7 so as not to permit the rapid discharge of water from the receptacle but also permit the water to engage the bulb 18 of the thermometer. This thermometer will be found very useful in hospitals, laboratories, bakeries and homes for registering the temperature of water, chemicals and like liquids and will be found very convenient for registering the temperature of the water when a bath is being prepared. The novel form of coupling for the inlet pipe 19 permits the device to be readily attached to any style of faucet having an interiorly threaded nozzle. In addition to this, the article is composed of a small number of parts which are arranged in a compact form so that the device occupies but a very small space when applied, and as there are no movable parts for controlling the inlet or operating the thermometer it will last indefinitely.

The invention having been set forth, what is claimed as new and useful is:—

1. As an article of manufacture, an attachment for faucets comprising a receptacle including a top and bottom, the bottom of said receptacle extending downwardly and forming an outlet, the top of the receptacle having an opening adjacent its forward portion, and an opening adjacent its rear portion, a thermometer disposed in said forward opening and extending interiorly and exteriorly of the receptacle, an inlet pipe disposed in the rear opening, and connecting means carried by said inlet pipe for detachably connecting said receptacle to the faucet.

2. As an article of manufacture, an attachment for faucets comprising a receptacle having an outlet member in one end, a thermometer support comprising a casing open at one end, and a frame, said support being supported by the opposite end of the receptacle, the casing being disposed within the receptacle, the frame extending beyond the second mentioned end of the receptacle, a thermometer carried by the support, the bulb of the thermometer being disposed adjacent the open end of the casing, the upper portion of the thermometer being connected to the frame, an inlet member supported by the second mentioned end of the receptacle in spaced relation to the thermometer support, and means carried by said inlet member for connecting the receptacle to a faucet.

In testimony whereof I hereunto affix my signature.

ARCHIE S. CAMPBELL.